UNITED STATES PATENT OFFICE.

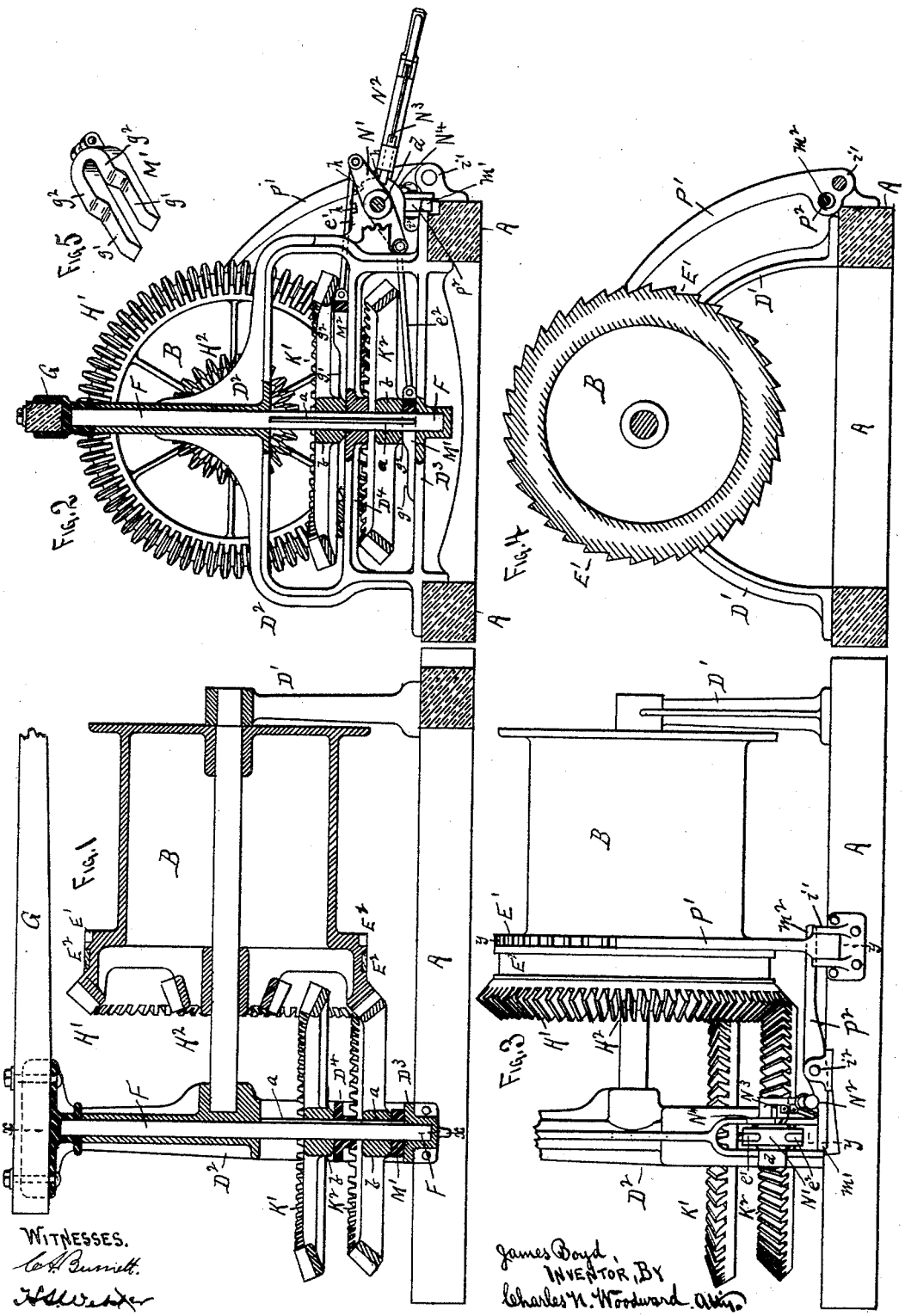

JAMES BOYD, OF ST. PAUL, MINNESOTA.

HOISTING-MACHINE.

SPECIFICATION forming part of Letters Patent No. 437,810, dated October 7, 1890.

Application filed April 15, 1890. Serial No. 347,936. (No model.)

*To all whom it may concern:*

Be it known that I, JAMES BOYD, a citizen of the United States, residing at St. Paul, in the county of Ramsey and State of Minnesota, have invented certain new and useful Improvements in Hoisting-Machines, of which the following is a specification.

This invention relates to that class of hoisting-machines in which the drum for the hoisting-cable is capable of being revolved at different speeds; and it consists in the arrangement of the mechanism whereby the change of speed is accomplished, as hereinafter shown and described, and specifically pointed out in the claims.

In the drawings, Figure 1 is a sectional side elevation. Fig. 2 is a cross-sectional elevation on the line $x\,x$ of Fig. 1. Fig. 3 is a side elevation. Fig. 4 is a cross-sectional view on the line $y\,y$ of Fig. 3. Fig. 5 is a perspective view of one of the U-shaped shifting-wedges removed.

A is the base-frame on which the cable-drum B is mounted by hangers or standards D′ D², and provided with the usual ratchet-teeth E′ and brake-rim E².

F is an upright shaft journaled in the standard D², and to whose upper end the "sweep" G is attached.

Upon the drum B are two bevel-gears H′ H², of different sizes, and upon the shaft F are two bevel-gears K′ K². These gears K′ K² are connected to the shaft F by a feather $a$, so that they may be moved upward and downward upon the shaft, but will at the same time revolve with the shaft. The gear K′ when elevated engages with the small gear H², and the gear K² when elevated engages with the larger gear H′.

Beneath the gear K² upon the lower horizontal member D³ of the frame D′ is a U-shaped wedge M′, and beneath the gear K′ upon the horizontal member D⁴ of the frame D′ is a similar U-shaped wedge M². The function of these wedges is to elevate the gears K′ K² when they are forced beneath their hubs $b$, and thus throw them into mesh with the gears H² and H′.

The wedges must be arranged to be operated alternately, and to accomplish this I have shown an arm N′, journaled centrally at $d$, and connected by rods $e'\,e^2$ to the wedges M′ M², the oscillation of this arm N′ causing the wedges to be alternately forced beneath the hubs $b$, and alternately throwing the gears K′ H² and K² H′ into mesh.

In Figs. 1 and 2 the wedge M² is shown forced inward beneath the gear K² and holding the latter in mesh with the gear H′, while the wedge M′ is shown withdrawn from beneath the gear K′, so that the latter is out of mesh with the gear H².

The wedges are formed double or with two surfaces $g'\,g^2$, as shown more clearly in Fig. 5, the upper surface $g^2$ adapted to elevate the gears K′ K² to their full capacity to engage with the gears H² H′, and the surface $g'$ adapted to elevate the gears K′ K² one-half their height, so as to hold both gears out of mesh with the gears H′ H².

The arm N′ is provided with a lever N², having a pawl N³ adapted to engage with notches $h$ in a segment N⁴ to hold the arm in its three positions—viz., first, with the wedge M² in its inward position and the wedge M′ in its outward position, as in Figs. 1 and 2; second, with the wedges in their reversed position, and, third, with the wedges held in their central position or with the surfaces $g'$ beneath the hubs $b$, so as to hold both gears K′ K² out of mesh with the gears H′ and H².

P′ is a pawl pivoted at $i'$ to the frame A and adapted to engage with the ratchet-teeth E′ on the drum B.

P² is a substantially horizontal lever pivoted at $i^2$ to the frame A and with one end $m'$ beneath the arm N′ and with the other end $m^2$ fitting through a hole in the pawl P′. The end $m'$ of the lever P² is so placed that when the arm N′ is oscillated it will force the end $m'$ of the lever downward and by correspondingly elevating the other end cause it to throw the pawl P′ out of contact with the ratchet-teeth on the drum.

If it is desired to merely reverse the position of the wedges, the arm N′ will merely actuate the lever P² and pass over it, allowing the pawl P′ to immediately return to its contact with the ratchet-teeth; but if it is desired to disengage both the gears K′ K² from the gears H² H′, which is done by holding the arm N′ in its perpendicular position, then the lower end of the arm N′ will by resting upon the end $m'$ of the lever P² hold the pawl P′ out of contact with ratchet-teeth on the drum B, which is the required position when the drum is disconnected from its driving-gearing.

By this simple construction the drum may be driven at a slow or more rapid speed or disconnected entirely from its driving mechanism by merely reversing the position of the wedges M' M² or holding them in a central position.

Having thus described my invention, what I claim as new is—

1. In a hoisting-machine, a drum B, having gears H' H², of different sizes, connected thereto, an upright shaft F, carrying gears K' K², adjustable thereon but adapted to be revolved therewith, and wedges M' M², adapted to be alternately inserted beneath said adjustable gears K² K' to alternately connect them with said gears H' H², substantially as and for the purpose set forth.

2. In a hoisting-machine, a drum B, having gears H' H², of different sizes, connected thereto, an upright shaft F, carrying gears K² K', adjustable thereon but adapted to be revolved therewith, wedges M' M², adapted to be alternately inserted beneath said adjustable gears to alternately connect them with said gears H' H², and an arm N', connected to said wedges and adapted when oscillated to alternately operate said wedges, substantially as and for the purpose set forth.

3. In a hoisting-machine, a drum B, having gears H' H², of different sizes, connected thereto, an upright shaft F, carrying gears K² K', adjustable thereon but adapted to be revolved therewith, and wedges M' M², having two level surfaces $g'$ $g^2$ and adapted to be alternately inserted beneath said adjustable gears to alternately connect them with said gears H' H² or hold them out of engagement therewith, substantially as and for the purpose set forth.

4. In a hoisting-machine, a drum B, having gears H' H², of different sizes, connected thereto and with ratchet-teeth E', an upright shaft F, carrying gears K² K', adjustable thereon but adapted to be revolved therewith, wedges M' M², adapted to be alternately inserted beneath said adjustable gears to alternately connect them with said gears H' H², an arm N', connected to said wedges and adapted when oscillated to alternately operate them, pawl P', adapted to engage with the ratchet-teeth on said drum, and pivoted lever P² with one end in contact with said pawl and with the other end beneath said arm N', whereby said pawl will be actuated by the oscillation of said arm, substantially as and for the purpose set forth.

In testimony whereof I have hereunto set my hand in the presence of two subscribing witnesses.

JAMES BOYD.

Witnesses:
C. N. WOODWARD,
H. S. WEBSTER.